United States Patent [19]

Anchor et al.

[11] 4,282,340

[45] Aug. 4, 1981

[54] POLYMERIZATION PROCESS FOR PREPARATION OF ACRYLAMIDE HOMOPOLYMERS WITH REDOX CATALYST

[75] Inventors: Michael J. Anchor, Canton Township, Wayne County; Robert Login, Woodhaven, both of Mich.

[73] Assignee: BASF Wyandotte Corporation, Wyandotte, Mich.

[21] Appl. No.: 111,402

[22] Filed: Jan. 11, 1980

[51] Int. Cl.³ .............................................. C08F 4/40
[52] U.S. Cl. ........................................ 526/93; 526/86; 526/94; 526/199; 526/200; 526/201; 526/202; 526/303
[58] Field of Search ..................... 260/29.2 R; 526/81, 526/86, 93, 94, 199, 200, 201, 202

[56] References Cited

U.S. PATENT DOCUMENTS

| 2,983,717 | 5/1961 | Henley | 526/303 X |
|---|---|---|---|
| 3,190,865 | 6/1965 | Miller | 526/86 |
| 3,255,164 | 6/1966 | Yisger | 526/229 |
| 3,332,922 | 7/1967 | Hoover | 526/86 |
| 3,509,113 | 4/1970 | Monagle | 526/208 |
| 3,557,061 | 1/1971 | Hamann | 526/201 |
| 3,573,242 | 3/1971 | Scoggins | 526/86 |
| 3,573,263 | 3/1971 | Gill | 526/229 |
| 3,583,960 | 6/1971 | Ishii | 526/200 X |
| 3,732,184 | 5/1973 | Lindemann | 526/86 |
| 3,770,680 | 11/1973 | Iacovielle | 526/86 |
| 3,814,742 | 6/1974 | Nagy | 526/201 X |
| 3,954,724 | 5/1976 | Nakashio | 526/200 |
| 3,969,329 | 7/1976 | Hirata | 526/303 X |
| 4,020,256 | 4/1977 | Zweigle | 526/88 |
| 4,042,772 | 8/1977 | Ballweber | 526/220 |
| 4,103,080 | 7/1978 | Böhmer | 526/303 |
| 4,151,333 | 4/1979 | Lenke | 526/303 |

OTHER PUBLICATIONS

Bikales, N. M., Water-Soluble Polymers, Plenum Press, 1973, pp. 213-225.

Primary Examiner—C. A. Henderson
Attorney, Agent, or Firm—Andrew E. Pierce

[57] ABSTRACT

There is disclosed a process for the aqueous polymerization of acrylamide to produce polymers of high molecular weight utilizing mixtures of water and monomer, at least one of which can be contaminated with small amounts of polymerization inhibiting components. In the process of the invention, a minimum amount of a redox pair catalyst is utilized in order to obtain the desired high molecular weight polymer. The minimum amount of catalyst is automatically provided to the polymerization mixture by adding a first member of a redox pair to the polymerization mixture and intimately combining a second member of the redox pair catalyst with an organic polymer capable of forming a colloidal dispersion in an aqueous medium and adding this intimate mixture to the mixture of water, acrylamide monomer, and a first member of the redox pair catalyst.

The process disclosed provides for the slow release of one member of the redox pair catalyst from said intimate mixture into an aqueous solution or emulsion polymerization medium. As polymerization proceeds, an additional amount of catalyst is made available by the slow recess of one member of the redox pair into the aqueous polymerization medium. The polymerization process can be initiated and maintained at ambient temperatures and pressures. Thus polymerization is effected without providing additional heat or pressure to the reaction mass. Molecular weights of about 1 million to 10 million can be obtained where monomer concentrations are held between about 10 to about 50 percent by weight of the polymerization mixture.

12 Claims, No Drawings

POLYMERIZATION PROCESS FOR PREPARATION OF ACRYLAMIDE HOMOPOLYMERS WITH REDOX CATALYST

BACKGROUND OF THE INVENTION

1. Field of the Invention

This invention relates to the production of high molecular weight polymers of acrylamide by a process of aqueous polymerization.

2. Description of the Prior Art

In U.S. Pat. No. 3,573,263 there is disclosed the preparation of water-soluble, high molecular weight synthetic polymers from monomers such as acrylic acid and acrylamide by the use of a redox system in conjunction with the use of an azo compound free-radical source. As indicated therein, the use of a redox catalyst only, without the additional azo compound catalyst, results in an exotherm during the process which causes greater initiator activity and thus, results in a branched polymer having a low molecular weight.

The problems involved in the preparation of high molecular weight polymers utilizing solution or emulsion polymerization of ethylenically unsaturated monomers are extensively discussed in U.S. Pat. No. 4,103,080, incorporated herein by reference. In prior art solution polymerization processes, the polymerization temperature of about 60° to about 70° C. has been used which causes the polymerization initiator to decompose rapidly. This results in too many polymer chains starting to form simultaneously with the end effect that too many chains which are short are produced. The resulting polymers are inadequately high in molecular weight. This has led to the use of polymerization initiators such as amines and ammonia. With the use of ammonia, generally extensive pH controls must be utilized to avoid the loss of ammonia and an uncontrolled course of reaction.

The process of U.S. Pat. No. 4,103,080 involves the addition of catalysts in at least three steps at intervals during the course of the polymerization in order to maintain the initiator concentration low enough so as to obtain the very high molecular weight polymers desired. In U.S. Pat. No. 4,042,772, the problem of obtaining acrylamide and acrylamide-acrylic acid polymers utilizing contaminated acrylamide is solved by the use of urea as an additive during the polymerization. Use of a water-in-oil emulsion polymerization process is described as particularly suitable for the production of said polymers utilizing a redox polymerization catalyst.

Other processes describing the polymerization of ethylenically unsaturated monomers utilizing redox polymerization catalysts are U.S. Pat. No. 3,509,113 and 4,020,256. There is no indication in the prior art that very high molecular weight polymers can be obtained by the use of a minimum of a redox catalyst sufficient to initiate polymerization, said minimum being determined by the slow release of at least one member of a redox pair into the polymerization mixture containing a second member of the redox pair catalyst. The slow release of one member of the redox pair being controlled by the rate at which the organic polymer, capable of forming an aqueous colloidal dispersion, is solubilized in said aqueous polymerization medium.

SUMMARY OF THE INVENTION

It is an object of this invention to provide to the art a process for the preparation of high molecular weight polymers by the aqueous polymerization, particularly the aqueous solution polymerization of acrylamide utilizing a redox polymerization catalyst system wherein polymerization is initiated at ambient temperatures and pressures utilizing a minimum amount of redox catalyst. In the process of the invention, a first member of a redox pair catalyst can be admixed with water and acrylamide monomer. The second member of the redox pair is separately intimately mixed with an organic polymer capable of forming a colloidal dispersion in an aqueous medium. Subsequently, the intimate mixture of polymer and second member of a redox pair is added to the mixture of water, monomer, and first member of the redox pair catalyst. As the organic polymer is solubilized, i.e., forms a colloidal dispersion, in the aqueous polymerization medium, the two members of the redox pair react in situ, free radicals are formed, and polymerization is initiated. Because the rate of solubilization of the organic polymer is generally less than instantaneous, and is usually accomplished at ambient temperatures and pressures over a period of about one minute to about two hours, the members of the redox pair do not combine instantaneously but do so over a period of time thus allowing a minimum amount of catalyst to be present for the initiation of polymerization and so as to provide controlled additional amounts of catalyst to be formed in situ as polymerization progresses.

DETAILED DESCRIPTION OF THE INVENTION AND PREFERRED EMBODIMENTS

The invention is concerned with the preparation of acrylamide homopolymers by an aqueous polymerization process utilizing redox catalysis in which a first member of a redox pair catalyst is slowly released into the aqueous medium and allowed to react with a second member of the said redox pair catalyst. The slow release is obtained by intimately combining one member of a redox pair catalyst with an organic polymer capable of forming a colloidal dispersion in an aqueous media. Acrylamide-acrylic acid copolymers can be formed from the acrylamide polymers prepared by the process of the invention by hydrolysis, as is well-known in the art. The direct preparation of high molecular weight copolymers of acrylic acid and acrylamide by the process of the invention would not be possible since acrylic acid would act as a chain stopper resulting in undesirably low molecular weight copolymers.

Useful organic polymers capable of forming a colloidal dispersion in aqueous media include natural and synthetic polymers such as cellulose-derived polymers modified for water dispersibility, starch, modified starch, natural gums, and water-dispersible proteins. Examples of useful synthetic polymers include alkylene oxide polymers, polyvinyl alcohol, polyvinyl pyrrolidone, polyacrylics, polyacrylamides, polyethylene imine, starch ethers, carboxy methyl cellulose, hydroxy ethyl cellulose and hydroxy propyl cellulose. Useful natural polymers include natural gums, starch, dextrin and water-dispersible proteins. Examples of useful natural gums include gum arabic, guar gum, alginic acid, alginates, Locust bean gum, Locust bean kernal gum, gum Tragacanth, gum Karaya, Iceland moss, and various seed extracts such as flax seed, psillium seed and quince seed extracts. Examples of useful starches include corn, potato, and tapioca starch. Useful dextrins include those derived from said starches. Examples of water-dispersible proteins include gelatin, casein, soya bean protein, albumen, hide glue, bone glue, and fish glue. Generally about 1 percent to about 10 percent by weight, based upon the weight of the acrylamide monomer, are utilized of these organic polymers. Preferably about 1 percent to about 5 percent by weight and most preferably, about 2 percent to about 3 percent by weight are used, all based upon the weight of acrylamide monomer.

Where the melting point of said organic polymer permits, the intimate blend with one member of the free-radical-generating redox pair catalyst is accomplished by melt-blending. Alternatively, said intimate mixture is made by forming an aqueous solution of said redox pair member with an aqueous colloidal dispersion of said organic polymer and subsequently evaporating the mixture to dryness.

In the process of the invention, at least one free-radical generating initiator of the redox type is used. Preferably, these include, as one member of the redox pair, at least one organic or inorganic peroxy compound. As the second member of the redox pair catalyst, there is used a peroxy compound activator, or reducing agent. Useful peroxy compounds include ammonium persulfate, potassium persulfate, hydrogen peroxide, diisopropyl peroxydicarbonate, bis(2,4-dichlorobenzoyl)peroxide, caprylyl peroxide, lauroyl peroxide, acetyl peroxide, tert-butyl peroxyisobutyrate, benzoyl peroxide, bis(p-chlorobenzoyl)peroxide, hydroxyheptyl peroxide, cyclohexanone peroxide, di-tert-butyl peroxyphthalate, tert-butyl peroxyacetate, tert-butyl peroxybenzoate, dicumyl peroxide, methyl ethyl ketone peroxide, di-tert-butyl peroxide, p-methane hydroperoxide, pinane hydroperoxide, cumene hydroperoxide, and 2,5-dimethyl-2,5-dihydroperoxide.

These peroxy compounds are used in accordance with the process of the invention preferably in conjunction with trace, or co-catalytic, amounts of a metal ion such as an iron (ferrous) salt, for instance, ferrous sulphate or iron pyrophosphate. Corresponding amounts of a peroxy compound activator, the second member of the redox pair, function as a reducing agent. The ferrous ion can be added in many forms, for instance, as colloidal dispersions of an iron pyrophosphate complex. Reducing sugars can be added to insure presence of the ferrous state and to act as chelating agents. The sodium formaldehyde sulfoxylate-iron-Versene complex is advantageous in that much less iron is required than is the case with the iron pyrophosphate system. Versene is a trademark for disodiumethylenediaminetetraacetate dihydrate, a chelating agent, which acts to keep the iron in a water-soluble state. Other metal ions can also be used as co-catalysts, particularly when complexed with salts of ethylene-diaminetetracetic acid or salicylic acid. Copper is preferred over the ferric ion since the cupric ion will not act as a chain terminator.

Useful peroxy compound activators include sodium sulfite, sodium bisulfite, sodium metabisulfite, and combinations of sodium bisulfite with ethylenediaminetetraacetic acid. Typical useful redox pairs and coupling metal salts are ammonium persulfate and 3,3',3"-nitrilotrispropionamide; sodium bromate and sodium sulfate; sodium bromate, sodium persulfate, and sodium sulfite or sodium bisulfite; potassium persulfate and sodium metabisulfite; ammonium persulfate and sodium bisulfite; ammonium persulfate and sodium metabisulfite; and hydrogen peroxide and thiourea.

In accordance with the process of the invention, the redox pair member activator can be added to the reaction vessel in combination with water and the acrylamide monomer. The proportion of said activator compound is generally about 0.05 to about 0.3 percent by weight based upon the weight of the monomer, preferably about 0.05 percent to about 0.2 percent by weight upon the weight of the monomer. Comparable proportions of peroxy compound can be used.

In the process of the invention, water is utilized as a reaction medium. Preferably, the water is deionized but the process of the invention is sufficiently flexible to utilize water contaminated with small amounts of various ions which would normally interfere with polymerization. In addition, acrylamide monomer can be used in the process of the invention in the unpurified form. Thus, the impure acrylamide utilized by Ballweber et al, in the polymerization which is disclosed in U.S. Pat. No. 4,042,772, can be utilized without the expedient of polymerization in the presence of urea.

As is well known, the molecular weight of polymers produced by a process of polymerization such as contemplated herein varies directly with the monomer concentration used in making the polymer. If higher molecular weight polymers are desired, the monomer concentration should be about 10 to about 50 percent by weight, preferably about 15 to 35 percent by weight, of the total polymerization reaction mixture. When monomer concentration rises above 50 percent by weight of the reaction mixture, the polymeric products formed generally contain a large amount of low molecular weight components. Generally, the polymers of the invention have a molecular weight within the range of about 1,000,000 to about 10,000,000.

By the process of the invention, acrylamide homopolymers can be prepared at ambient temperatures and pressures. Certain of the polymerization conditions required are those under which polymers have been prepared in the prior art. Thus, the aqueous solution of monomer containing one member of a redox pair as activator is purged with nitrogen or carbon dioxide or other inert gas in order to remove entrained oxygen which would interfere with the polymerization. In the process of the invention, the polymerization is initiated at ambient temperatures and at atmospheric pressure. No additional heat need be added to the polymerization mixture since, once the polymerization is initiated by the generation of sufficient free radicals, the heat released is sufficient for polymerization. Generally, the reaction temperature is not allowed to rise above a maximum of about 60° C., preferably a maximum temperature of about 50° C., and most preferably a maximum temperature of about 40° C.

Molecular weight regulators, such as those disclosed in the prior art, are generally not included in the reaction mixture since very high molecular weights are desirable. Thus, compounds such as acetone, methanol, ethanol, isopropyl alcohol, polyethylene glycol, etc., are unnecessary in the process of the invention. The control of the pH of the reaction medium is also generally unnecessary. This is not to imply that the pH of the reaction medium is not important, since hydrolysis of amide groups can take place at high pH and imidization is favored at low pH and at high temperatures. A pH range of about 3 to about 8 is satisfactory, preferably about 3 to about 6. Generally the tap water available has a pH within this range and therefore is acceptable for use in the process of the invention.

The polymerization reaction of the invention also can be carried out in the presence of a salt or a buffer system involving the use of one or more salts in combination. Such buffer systems can include an alkali metal or an ammonium acetate, carbonate, bicarbonate, chloride, phosphate, sulfate, bisulfate, or borate. Alkali metal and ammonium salts of other weak acids are also useful. The amount of buffer salt which can be used is about 0.1 percent to about 2 percent by weight, preferably about 0.2 percent to about 1 percent by weight of the reaction mixture. The pH can be buffered in the range of about 3 to about 8, preferably about 5 to about 7.

The process of the invention can be carried out with or without the addition of one or more other materials commonly added to the reaction mixtures of the prior art. For instance, a surfactant can be employed where it is necessary to reduce the chance that polymeric materials produced in the process will adhere to or build up on the walls of the reactor and other equipment used. The use of surfactants during polymerization to reduce deposits on the walls of the reactor is well known in this art. The amounts of surfactants utilized are also well known and are not critical to the process of the invention.

Generally, the polymerization is conducted utilizing agitation during at least the initial stages of polymerization. As polymerization progresses, the viscosity can become so great that effective agitation of the mixture is no longer possible. In contrast to the acrylamide polymers produced in the prior art, the process of the invention results in high molecular weight polymer solutions without the presence of the insoluble particles found in aqueous acrylamide solutions prepared using dry powders obtained by drying an aqueous solution or emulsion of an acrylamide polymer. The viscosity of the polymerization mixture is directly proportional to the concentration of monomers utilized and the molecular weight obtained. Isolation of the polymers produced by the process of the invention can be accomplished, if desired, in conventional ways.

The polymers of the invention are obtained in aqueous solution and are suitable for many uses simply upon dilution to a lower solids content. Thus, the polymer solutions of the invention are useful in the mining and process industries, the paper industry, oil well applications and drinking water and waste-water treatment. In the mining and process industries, solids must be separated from water in process streams in which they are suspended. The separation process can be one involving settling, filtration, centrifuging or combinations thereof. The objective of the separation being the recovery of a valuable, relatively water-free cake or filtrate or the production of solid or liquid products suitable for disposal. The addition of a high molecular weight polyacrylamide as a flocculant ties together the colloidal particles in the process stream, thus forming heavy agglomerates which settle out rapidly leaving a supernatant liquid free of solids. Similar applications for the polymers of acrylamide prepared by the process of the invention exist in the paper industry and in water and wastewater treatment. In oil well applications, high molecular weight polyacrylamides improve the efficiency of aqueous hydraulic fracturing and water-flood treatment of oil reservoirs. The use of dilute solutions of polyacrylamides in the hydraulic fracturing operation reduces the friction loss of the fracturing fluid and the horsepower requirement of the pumping units by reducing the extremely high pressure drops which develop during the hydraulic fracturing operation where polyacrylamides are not ulitized as additives.

Because of the simplicity of the process of the invention and its relative freedom from the need to provide adjustments in pH and since the process does not require the use of deionized water or even purified monomer, i.e., acrylamide, the process of the invention is particularly suited for the preparation of high molecular weight polyacrylamide homopolymers at the site of an oil well. Production on site eliminates the necessity of isolating as a dry powder the polyacrylamide homopolymer. Shipping costs and the costs of preparing an aqueous solution of the polymer prior to use are thus eliminated. Similar advantages would result by the utilization of the process of the invention for the preparation of polyacrylamide homopolymers on site in paper mills and in water and waste-water treatment plants.

Where it is desired to isolate the polymers produced by the process of the invention, it is desirable to utilize a solution-precipitation process of polymerization or alternatively, conduct the reaction in a so-called inverse emulsion in which the acrylamide polymer is present in a concentrated aqueous solution which is dispersed in an organic medium as small droplets. Generally, a surface active stabilizer is used to prevent coagulation of the emulsion. Both solution-precipitation polymerization and polymerization utilizing an inverse emulsion are procedures well known in the prior art. One skilled in the art would know how to utilize teachings herein to produce polymers in accordance with these prior art polymerization procedures. It is noted that, in the solution-precipitation procedure of polymerization, the monomer is soluble in the reaction medium but the resulting polymer is not. Thus, the medium never gets very viscous as is the case with the solution-polymerization process exemplified herein and the polymer is relatively easy to isolate and dry. Similarly, conducting the polymerization process by the inverse emulsion process does not result in a significant rise in viscosity of the medium. Thus, the polymer is relatively easy to isolate and dry as compared with a solution of the polymer.

The following examples illustrate the process of the invention. Where not otherwise specified throughout the specification and claims, temperatures are given in degrees centigrade and parts, percentages and proportions are by weight.

EXAMPLE 1

A polymer of acrylamide was prepared by the process of the invention in accordance with the following procedure. At ambient temperature and pressure, a glass bottle containing 142.8 grams of water was charged with 35.7 grams of acrylamide. The mixture was sparged with nitrogen and then 0.035 gram of sodium metabisulfite was added followed by one drop of a 0.1 percent by weight aqueous solution of ferrous sulfate. In a separate container, 0.18 gram of ammonium persulfate was melt-blended with 15 grams of polyethylene glycol having a molecular weight of about 1500. This mixture was then added to the water, acrylamide and sodium metabisulfite-ferrous sulfate mixture in the amount of 1.67 grams. Polymerization to the gel stage thereafter took place in 30 minutes and resulted in an exotherm to a temperature of 30° C. Upon dilution of the mixture to a five percent by weight solids basis, a viscosity of 100 centipoise was obtained as measured by a Brookfield viscometer LVT spindle No. 2 at 25° C. and 60 rpm.

EXAMPLES 2–11

Example 1 is repeated utilizing the following polymers to replace the polyethylene glycol: partially hydrolyzed polyvinyl alcohol, polyacrylate, polyacrylamide, polyethylene imine, polyvinyl pyrrolidone, gum arabic, casein, gelatin, hydroxyethyl cellulose, and corn starch. Where melt-blending as a means of incorporating the ammonium persulfate with said polymers is not feasible, mixtures are made of aqueous solutions of the polymers. These mixtures are subsequently dried before use. A viscous gel is obtained.

While this invention has been described with reference to certain specific embodiments, it will be recognized by those skilled in this art that many variations are possible without departing from the scope and spirit of the invention.

The embodiments of this invention in which an exclusive privilege or property are shown are claimed as follows:

1. A process for the preparation of high molecular weight acrylamide homopolymers utilizing a free-radical-generating redox pair catalyst comprising
   (A) maintaining at ambient temperature and pressure under aqueous polymerization conditions a mixture of water, 10 to 50 percent by weight of said mixture of acrylamide monomer, a catalytic amount of a metal ion co-catalyst, and a catalytic amount of a first member of the Redox pair catalyst,
   (B) intimately combining an organic polymer capable of forming a colloidal dispersion in aqueous media with a catalytic amount of a second member of a redox pair catalyst,
   (C) admixing (A), (B), and allowing polymerization to initiate, no heat or pressure being added during the polymerization process, and
   (D) recovering an aqueous mixture of a high molecular weight acrylamide homopolymer.

2. The process of claim 1 wherein said metal ion co-catalyst is cuprous copper or ferrous iron and said organic polymer capable of forming an aqueous colloidal dispersion is intimately combined with said member of said redox pair catalyst by melt-blending or by preparing a mixture of
   (A) an aqueous solution of one member of said redox pair catalyst and
   (B) a colloidal dispersion of said organic polymer, and
   (C) subsequently evaporating substantially all water from said aqueous mixture.

3. The process of claim 2 wherein the redox pair comprises a peroxy compound activator and a peroxy compound.

4. The process of claim 3 wherein said peroxy compound is selected from the group consisting of ammonium persulfate, potassium persulfate, hydrogen peroxide, and mixtures thereof and wherein said activator is selected from the group consisting of sodium sulfite, sodium bisulfite, sodium metabisulfite, and mixtures thereof.

5. The process of claim 4 wherein said organic polymer, is a natural or synthetic polymer selected from the group consisting of cellulose polymers modified for water-dispersibility, starch, modified starch, natural gums, and water-dispersible proteins.

6. The process of claim 5 wherein said synthetic polymer is selected from the group consisting of alkylene oxide polymers, polyvinyl alcohol, polyvinyl pyrrolidone, polyacrylics, polyacrylamides, and polyethylene imine.

7. The process of claim 5 wherein said modified cellulose polymers are selected from the group consisting of carboxymethyl cellulose, hydroxyethyl cellulose, hydroxypropyl cellulose, and mixtures thereof.

8. The process of claim 5 wherein said natural polymer is selected from gum arabic, guar gum, alginic acid, alginates, Locust bean gum, Locust bean kernel gum, gum Tragacanth, gum Karaya, Iceland moss, and extracts of flax seed, psillium seed, and quince seed.

9. The process of claim 5 wherein said water-dispersible proteins are selected from the group consisting of gelatin, casein, soya bean protein, albumen, hide glue, bone glue, and fish glue.

10. The process of claim 6 wherein said aqueous polymerization is a solution polymerization process, said synthetic polymer is an alkylene oxide polymer, said redox pair is ammonium persulfate and sodium metabisulfite, and said metal ion is ferrous sulfate.

11. The process of claim 10 wherein said redox pair catalyst is used in the proportion of 0.05 to 0.3 percent by weight of each member of said redox pair based upon the weight of said acrylamide monomer.

12. The process of claim 11 wherein the proportion of said organic polymer capable of forming a colloidal dispersion in aqueous media is about 1 percent to 10 percent by weight based upon the weight of said acrylamide.

* * * * *